(12) United States Patent  
Lee

(10) Patent No.: US 8,919,682 B2  
(45) Date of Patent: Dec. 30, 2014

(54) KITCHEN WASTE DISPOSAL SYSTEM

(71) Applicant: Manbiu Lee, Chai Wan (HK)

(72) Inventor: Manbiu Lee, Chai Wan (HK)

(\*) Notice: Subject to any disclaimer, the term of this patent is extended or adjusted under 35 U.S.C. 154(b) by 0 days.

(21) Appl. No.: 13/934,593

(22) Filed: Jul. 3, 2013

(65) Prior Publication Data

US 2014/0070037 A1    Mar. 13, 2014

(30) Foreign Application Priority Data

Sep. 13, 2012 (CN) .......................... 2012 1 0340187

(51) Int. Cl.
*B02C 21/00* (2006.01)
*B02C 9/04* (2006.01)
*C05F 17/02* (2006.01)

(52) U.S. Cl.
CPC .................................. *C05F 17/0247* (2013.01)
USPC ..... 241/46.06; 241/65; 241/101.2; 241/101.8

(58) Field of Classification Search
USPC ............. 241/46.06, 46.013, 101.8, 11.2, 650, 241/101.2, 65

See application file for complete search history.

(56) References Cited

U.S. PATENT DOCUMENTS

| | | | | |
|---|---|---|---|---|
| 5,123,600 | A | * | 6/1992 | Takenaka .................. 241/46.013 |
| 7,240,865 | B2 | * | 7/2007 | Choi .......................... 241/46.014 |
| 8,464,970 | B2 | * | 6/2013 | Ceru et al. ...................... 241/21 |
| 2009/0277981 | A1 | * | 11/2009 | Lee ........................... 241/46.013 |

\* cited by examiner

*Primary Examiner* — Faye Francis

(74) *Attorney, Agent, or Firm* — The Webb Law Firm

(57) ABSTRACT

Disclosed is a kitchen waste disposal system which includes a residue feeding mechanism, a mechanical gear grinding mechanism and a paddle-type stirring mechanism. The residue feeding mechanism receives kitchen waste and leads the kitchen waste into a mechanical gear grinding zone in the disposal system. The mechanical gear grinding mechanism is provided with a double-shaft bi-directional gear grinding component. Two gear shafts are arranged in parallel and rotate in opposite directions. Each gear shaft is provided with first buckle gears and second buckle gears, and the first buckle gears and the second buckle gears are combined to crush the kitchen waste from the residue feeding mechanism. The paddle-type stirring mechanism comprises a W-shaped treatment groove and a paddle component in the middle of the treatment groove.

12 Claims, 7 Drawing Sheets

KITCHEN WASTE DISPOSAL SYSTEM

CROSS REFERENCE TO RELATED APPLICATION

This application claims the benefit of Chinese Patent Application No. 201210340187.0 entitled "Kitchen Waste Disposal System", filed Sep. 13, 2012, which is hereby incorporated by reference in its entirety.

FIELD OF THE INVENTION

The invention relates to a waste disposal system, in particular to a system for disposing of kitchen waste.

BACKGROUND ART

With the high possibility of being rotten and stinky in a relatively short period of time to expedite the reproduction of mosquitoes and flies, kitchen waste emerges as a source of serious pollution to the surrounding environment when being treated, stored, collected, transferred and landfilled, thereby becoming an urgent global problem. The recently published statistics indicate that nowadays each head in the world produces over 0.7 kg of waste per day, of which 40% is attributed to food waste. At present, most kitchen waste disposal equipments just treat waste by crushing to convert kitchen waste into fluids which can either be directly discharged through drain pipes or be stored and transported to other places for reuse. Therefore, crushing is hardly an efficient way of treating waste. Meanwhile, the majority of waste leads to environmental pollution or waste.

As a result, biological decomposition of kitchen waste becomes a key global problem that needs an urgent solution. To provide a universally feasible method of disposing of renewable kitchen waste so that limited resources on the earth can be put to best use, resource recycling is a especially recognized solution.

SUMMARY OF THE INVENTION

The invention is designed to overcome the defects in the above-mentioned prior art. Through the processes of mechanical gear grinding, paddle-type stirring, water evaporation and circulated temperature baking, as well as supporting mechanisms, the invention can convert kitchen waste into organic fertilizer in hours, thereby effectively improving soil structure, facilitating the growth of crops, achieving hygienization and harmless treatment of waste, and contributing to the recycling of resources.

To achieve the above-mentioned purpose, the invention provides a kitchen waste disposal system comprising a residue feeding mechanism, a mechanical gear grinding mechanism and a paddle-type stirring mechanism, the residue feeding mechanism receives kitchen waste and leads the kitchen waste into a mechanical gear grinding zone in the disposal system; the mechanical gear grinding mechanism is provided with a double-shaft bi-directional component, wherein two gear shafts are arranged in parallel and rotate in opposite directions, each gear shaft is provided with first buckle gears and second buckle gears, and the first buckle gears and the second buckle gears are combined to crush the kitchen waste from the residue feeding mechanism; and the paddle-type stirring mechanism comprises a W-shaped treatment groove and a paddle component in the middle of the treatment groove, the kitchen waste is crushed into paste by the mechanical gear grinding mechanism, the pasty kitchen waste is stirred in the treatment groove and then treated with water evaporation, circulated temperature baking and ventilative deodorization to prepare granular organic fertilizer which is shoveled by the paddle component to the outlet. After double-shaft bi-directional mechanical gear grinding, paddle-type stirring in a high-temperature high-humidity control environment in the W-shaped treatment groove and 8-10 hours of treatment, the kitchen waste can be converted to granular organic fertilizer. In order to obtain organic fertilizer of high nutritional value, all that is needed is to store the prepared fertilizer in an aerophobic container for spontaneous secondary fermentation continuing 30 to 60 days.

In the above-mentioned technical scheme, the residue feeding mechanism is provided with a quadrangled V-shaped feed inlet.

In the above-mentioned technical scheme, the quadrangled V-shaped feed inlet is covered with a safety valve, a right-angle sensor is arranged at the rear part of the safety valve, and an adapter-type sensor is arranged at the front part of the safety valve.

In the above-mentioned technical scheme, the mechanical gear grinding mechanism further comprises a fixed gear cleaning row, the gear shafts are moderately rotated backwards when the first buckle gears and the second buckle gears are prevented from being combined to crush the kitchen waste, and residue on buckle gear teeth is cleaned up through the retaining gear teeth of the fixed gear cleaning row.

In the above-mentioned technical scheme, the left side wall and the right side wall of the W-shaped treatment groove are arc-shaped, and a ridged bulge is arranged in the middle of the W-shaped treatment groove.

In the above-mentioned technical scheme, the paddle component comprises two rotating shafts and T-shaped paddles respectively arranged on the two rotating shafts, the plurality of T-shaped paddles on each rotating shaft are spaced uniformly, and the stretching angle and direction of each T-shaped paddle are matched with the position of the outlet.

In the above-mentioned technical scheme, a humidity sensor and a temperature sensor connected with a control system are arranged at the top of the W-shaped treatment groove, and pending pasty kitchen waste in the W-shaped treatment groove is degraded biologically while being metabolized into water, gas and biological heat energy in an environment with high temperature and high humidity.

In the above-mentioned technical scheme, through the cover of the W-shaped treatment groove, vapor is condensed into water to wash the inner wall of the residue feeding mechanism and the mechanical gear grinding mechanism.

In the above-mentioned technical scheme, a sealed U-shaped groove and a constant warm tube are combined to control the temperature of heavy oil so that the constant temperature environment in the W-shaped treatment groove can be controlled.

In the above-mentioned technical scheme, the disposal system is further provided with a ventilative deodorization device which comprises a double fan, an odor collector and an air discharge duct, the vapor is blown into the air discharge duct through the double fan, and the odor collector is connected with the air discharge duct for ionized deodorization of odor ions.

In the above-mentioned technical scheme, a four-corner balance electronic scale is arranged at the foot of the stand of the disposal system and is used for recording feed and discharge data.

In the above-mentioned technical scheme, the disposal system further comprises a starch film paper bag for collecting kitchen waste, and the starch film paper bag can be degraded together with the kitchen waste.

Compared with the prior art, the invention has the following benefits:

1. A double-shaft bi-directional gear grinding mechanism is adopted. Due to the buckle gears that rotate in the opposite directions, better gear grinding effect can be achieved. In case of blockage during gear grinding of waste, the rotating shafts can be moderately rotated backwards to allow for cleaning by the fixed gear cleaning row, so that further gear grinding and crushing can be performed. Therefore, kitchen waste can be better crushed;

2. The W-shaped treatment groove is shaped to help thoroughly stir pasty waste. Through the paddle-type stirring component, prepared granular organic fertilizer can be shoveled to the fertilizer outlet more easily;

3. Vapor in the treatment groove is condensed into water on the cover so as to clean the inner wall of the feed inlet and the gear grinding mechanism. Meanwhile, outgoing water is clean and harmless to the environment;

4. Through ventilative deodorization, odor ions can be effectively ionized, so that pollution of air and environment and disturbance by mosquitoes and flies can be avoided;

5. Through the double-electric temperature control tube and a high oil temperature device, an oil temperature machine can reach the temperature of 300° C. With the advantages of large temperature control scope, excellent heat certainty, rapidity in heating and cooling and accurate temperature control as well as computerized touch control, the double-electric temperature control tube can effectively maintain a constant temperature environment in the treatment groove;

6. The induction device for a feed valve can effectively monitor the working condition of the valve;

7. The four-corner balance electronic scale can be used to conveniently record weight data during feeding and discharging;

8. Upon the collection of a certain amount of waste, the starch film paper bag can be put into the feed port together with the waste, so that the paper bag and the kitchen waste are degraded altogether.

Figure 1:
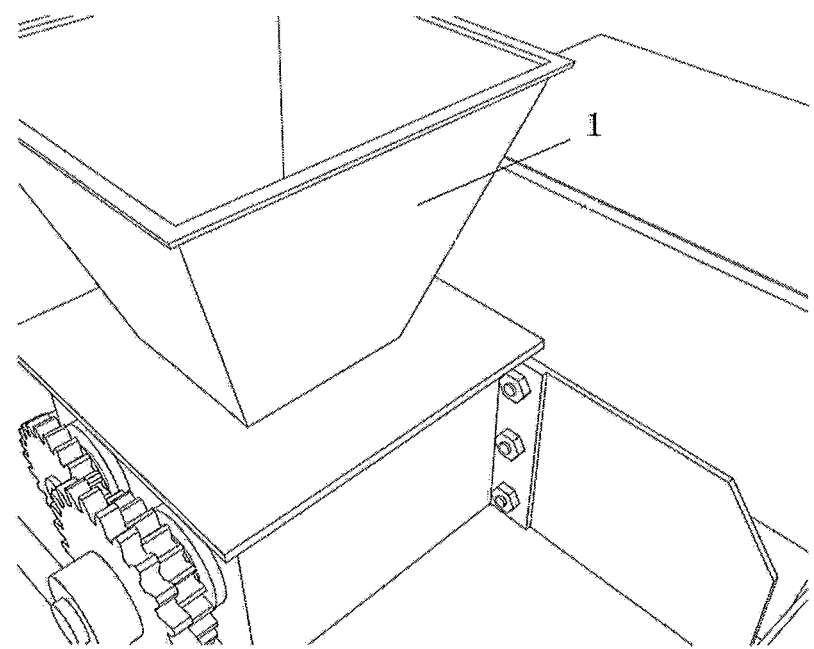
FIG. 1 is the schematic diagram of the kitchen waste feeding mechanism in the kitchen waste disposal system.

1—quadrangled V-shaped feed inlet, 2—induction valve, 21—right-angle sensor, 22—adapter-type sensor, 23—valve bracket, 24—switch crossarm, 3—mechanical gear grinding mechanism, 31—first buckle gear, 32—second buckle gear, 41—double-shaft double-electric temperature control tube, 5—fixed gear cleaning row, 6—paddle-type stirring mechanism, 61—W-shaped treatment groove, 62—T-shaped paddle, 63—treatment groove ridged bulge, 64—fertilizer outlet, 7—cover, 8—drainage conduit, 91—sealed U-shaped groove, 92—heavy oil refueling port, 93—heavy oil outlet, 10—temperature control sensor, 11—double fan, 12—air discharge duct, 13—odor collection system, 14—machine bottom socle, 15—LED screen display, 16—electronic scale, 17—starch film paper bag, 18—scanner, 19—valve induction zone.

DETAILED DESCRIPTION

In combination with the figures, the specific embodiment of the invention is described in details in the following pages. However, it should be understood that the scope in which the invention is protected is not subject to the specific embodiment.

The invention discloses a kitchen waste disposal system and a method thereof, which are designed to solve the problem of organic waste in kitchen waste. Through the system, the organic waste can be directly converted into effective organic fertilizer products, so that pollution sources are greatly reduced. The organic fertilizer can be used for cultivating quality soil. Mainly used in places such as restaurants, supermarkets, groceries or food processing plants, the system and method disclosed by the invention can dispose of 100 to 500 kg of kitchen waste per day and convert the waste into organic fertilizer in 10 to 16 hours. The process starts with the crushing of kitchen waste (for example, hard waste such as bones, shells) by mechanical gears, followed by dynamic microorganism fermentation reaction in which the volume and weight of the kitchen waste are reduced by over 90% without heating, and during which the deodorization system can filter air odor, thereby effectively optimizing the working environment.

The system and method disclosed by the invention can directly convert kitchen waste into organic fertilizer on the spot at the source and effectively dispose of hard food residue. The system's converting kitchen residue into granular organic fertilizer, can reduce the urban pollution and energy losses caused by transporting and disposal in the conventional manner, cut down on the labor cost, achieve high resource recycling efficiency, and provide harmless soil and healthy air. The system and method disclosed by the invention have the following characteristics:

Disposal at the source: the invention is original in that waste is disposed of on the spot, so that resources for piling up to be treated and transporting are saved;

Gear grinding of residue: the invention is original in that double-shaft bi-directional mechanical gear grinding is adopted to dispose of hard food residue;

Heat energy recycling: the invention is original in that a heat transfer conduit and thermal insulation tiles are attached to the outer side of a fermentation tank and can absorb high temperature produced during the conversion of a large amount of humus for recycling;

Systematic treatment: food waste is automatically disposed of in the same integrated container. The volume and weight of kitchen residue can be reduced by up to 90% in hours, and granular organic fertilizer of high quality can be produced;

High temperature sterilization: during fermentation, high temperature is applied to exterminate pathogenic bacteria and achieve more active decomposition of beneficial microorganisms;

Closed fermentation: after the condition inside the groove is automatically set to the optimum in terms of temperature, humidity, pH value and oxygen supply, fermentation is conducted to eliminate odor, mosquitoes and flies;

Safety and sanitation: due to the adoption of mechanical dynamic fermentation process and rapid decomposition by effective bacterial species, waste from daily life is reduced, so that the sanitation target of converting waste to harmless resources and making use of harm and waste for good ends can be achieved.

Figure 2:
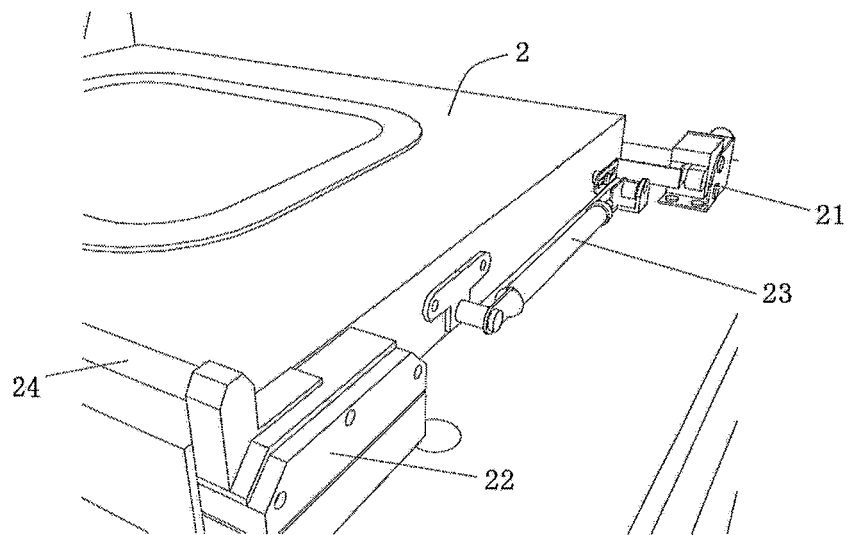
FIG. 2 is the schematic diagram of the safety valve at the waste feed port in the kitchen waste disposal system.

The structure and functions of the system are described in details as follows (embodiment of the system):

Residue feeding mechanism:

As shown in FIG. 1, the residue feeding mechanism of the kitchen waste disposal system comprises a quadrangled V-shaped feed inlet 1 which can lead collected kitchen waste to smoothly enter the mechanical gear grinding zone. As shown in FIG. 2, a top spin adapter-type induction valve 2 is arranged at the upper end of the feed inlet; the induction valve is provided with double safety sensors, that is a right-angle sensor 21 positioned at the rear part of the safety valve and an adapter-type sensor 22 positioned at the front part of the valve 2; and when the valve 2 is opened at a right angle, the right-angle sensor 21 sends an induction signal to a control system which puts an end to mechanical gear grinding. In case that the valve 2 is closed to start the system while the valve is not closed completely, the adapter-type sensor 22 sends an induction signal to the control system which generates an audio prompt. At the feeding stage, the induction valve 2 can be opened so that kitchen waste such as food residue from hotels and restaurants, rotten food from supermarkets or residue from food factories (including vegetables, fruits, meat, bones, seafood, shells, hard waste such as broken branches, rotten leaves) can be directly put into the quadrangled V-shaped feed inlet 1; and after the induction valve 2 is closed, the safety button is rotated to enable the sensors to start working. A valve bracket 23 is arranged along the direction of the valve on the side edge of the valve 2 and used for supporting the opened valve. A switch crossarm 24 used for controlling the operation of the valve is arranged on the outer edge at the front part of the valve.

Figure 3:
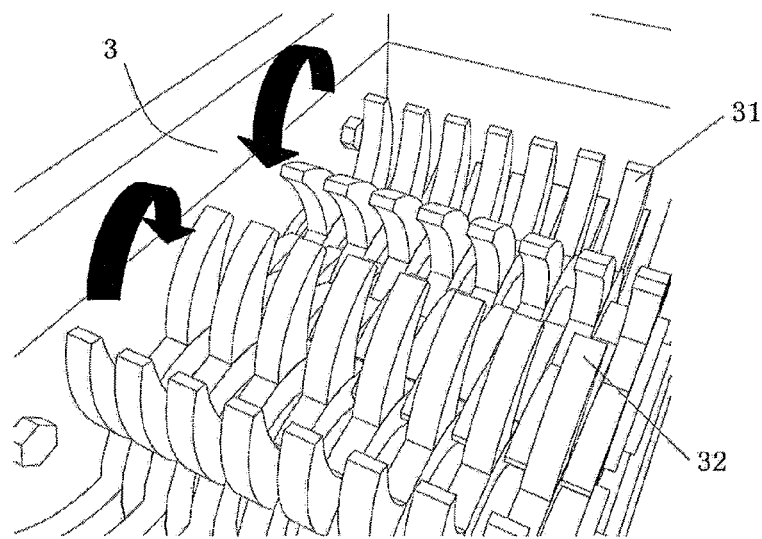
FIG. 3 is the schematic diagram of the double-shaft bi-directional gear grinding mechanism in the kitchen waste disposal system.
Figure 4:
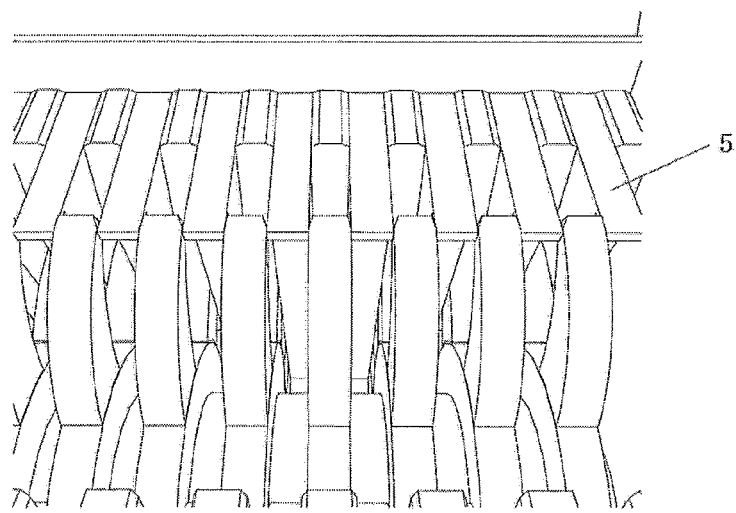
FIG. 4 is the schematic diagram of the fixed gear cleaning row used in the gear grinding groove.
Figure 10:
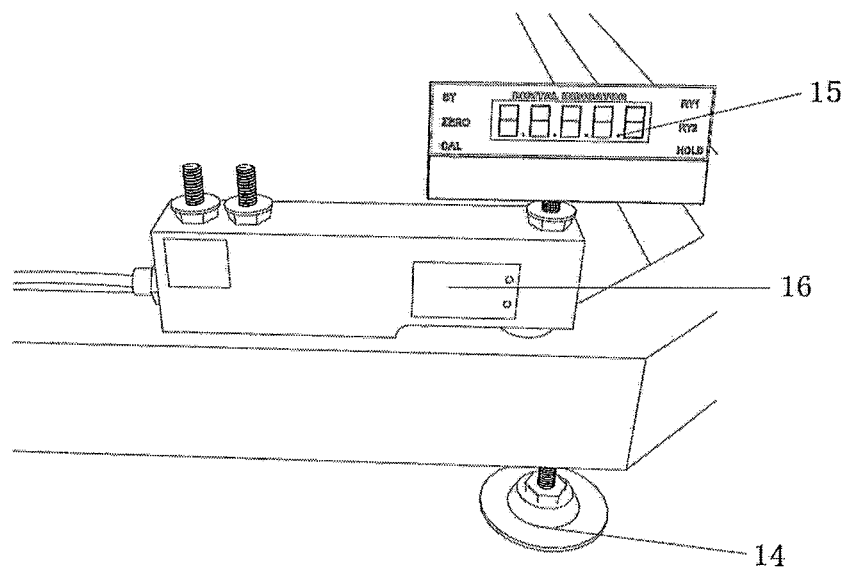
FIG. 10 is the schematic diagram of the four-corner balance electronic scale in the kitchen waste disposal system.
Figure 11:
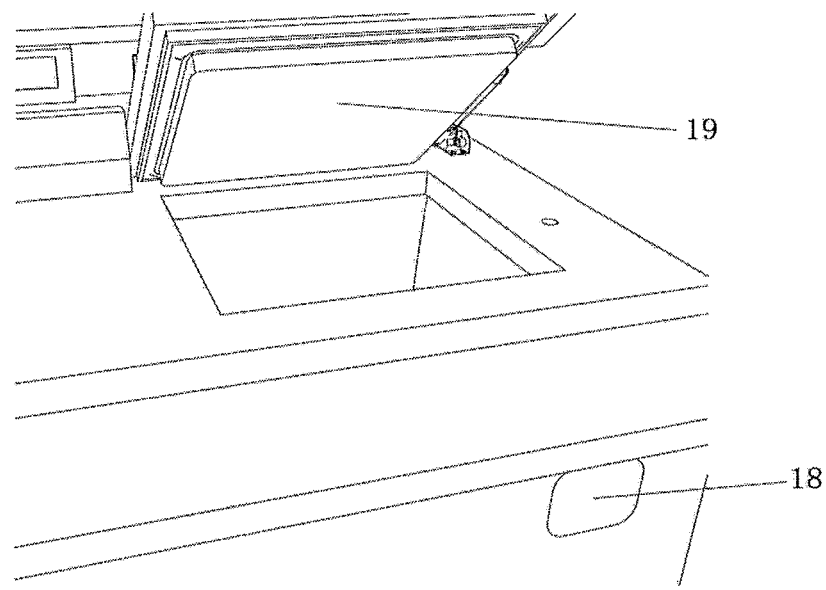
FIG. 11 is the schematic diagram of the feed valve scan and induction device in the kitchen waste disposal system.
Figure 12:
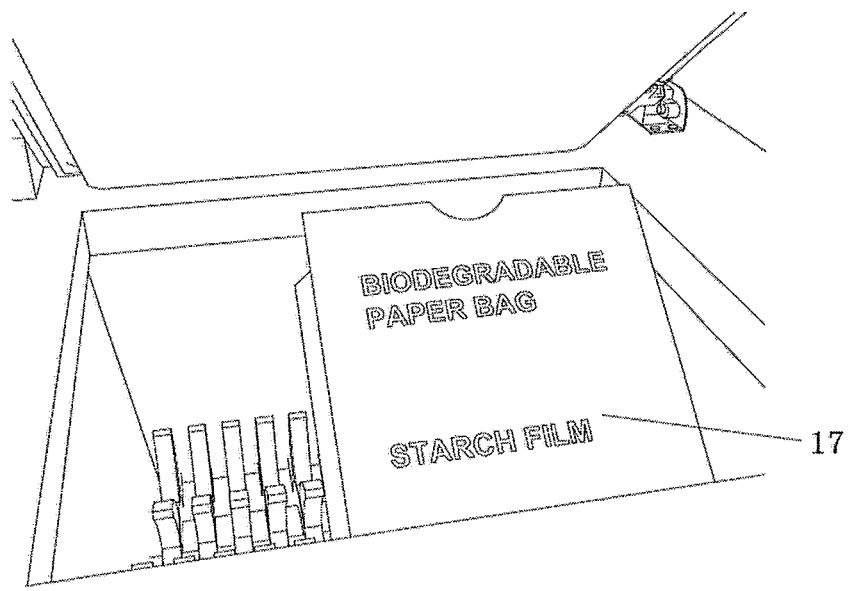
FIG. 12 is the schematic diagram of the decomposable starch film paper bag in the kitchen waste disposal system.

Mechanical Gear Grinding Mechanism:

When the kitchen waste entering through the quadrangled V-shaped feed inlet 1 arrives at the mechanical gear grinding zone, food residue is dropped on bi-directional buckle gear type gears. As shown in FIG. 3, two gear shafts are arranged in parallel and rotate in opposite directions; the rotation of the axis of each gear shaft is driven by a chain shaft outside the gear grinding zone; buckle gears, that is a first buckle gear 31 and a second buckle gear 32, are uniformly spaced in the circumferential direction on each gear shaft; the first buckle gear 31 and the second buckle gear 32 are arranged oppositely; therefore, when the two gear shafts rotate oppositely, the first buckle gear 31 and the second buckle gear 32 in corresponding positions are combined to crush the food residue entering through the quadrangled V-shaped feed inlet. Gears are controlled to conduct circulating rotation in the opposite directions through weight induction devices additionally arranged at the tops of the socles. The weight induction devices are provided at the tops of the socles respectively. As shown in FIG. 10, when kitchen residue is fed, due to the loading of weight, the electronic display can calculate the total weight of the fed kitchen residue. A motor is rotated to control the two buckle gear type gears to perform gear grinding on the food residue in the gear grinding zone before entering the treatment groove. In the treatment groove, if the gears are prevented from rotating, the gears can perform moderate rotation before conducting circulating rotation. The purpose of moderately rotating the shafts backwards is to enable the incoming waste to rotate reversely so as to transfer the position of the waste. Moderate backward rotation control is normally formed by various typical circuits (such as a time delay circuit, an interlock circuit, a sequential control circuit, and the like) and used to control the startup, operation and stoppage of controlled equipment in a main circuit, so that the equipment in the main circuit functions normally as per the requirements of the design technology. As shown in FIG. 4, the fixed gear cleaning row 5 can clean up the food residue in the groove in the gear grinding zone. The fixed gear cleaning row comprises retaining gear teeth which are fixed on the front and rear walls of the feed groove in a protruding manner. Matched with the gear teeth of the gear blade on two sides, the retaining gear teeth of the gear cleaning row can have the residue attached to the gear teeth shoveled out when the rotating shafts are rotated reversely, so that the rotating shafts can press the residue towards the center into the groove when conducting clockwise rotation. Normally, the process can be completed in 10 to 60 seconds.

Figure 5:
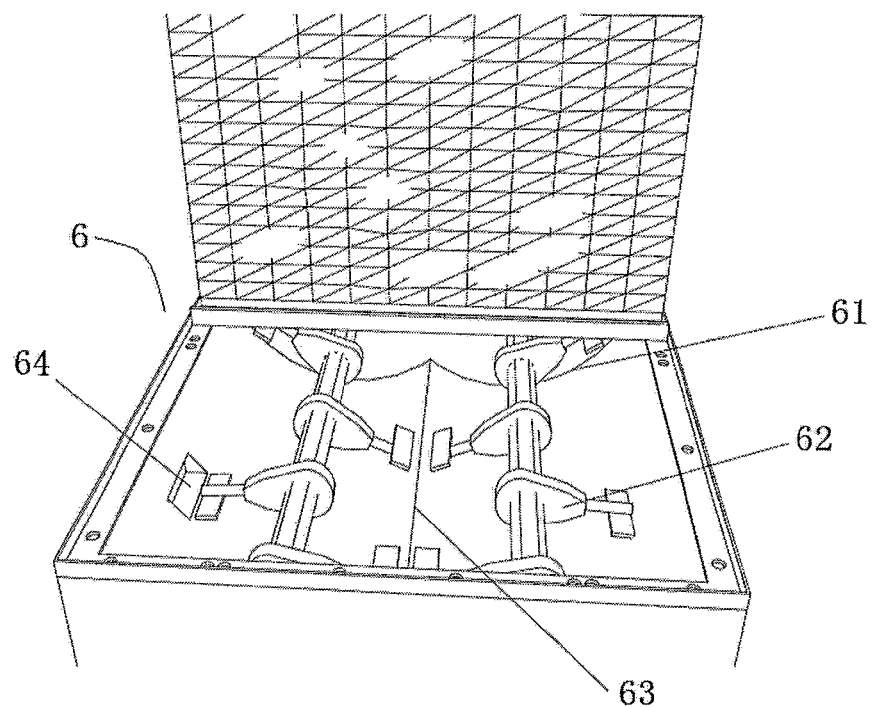
FIG. 5 is the schematic diagram of the paddle-type stirring mechanism in the kitchen waste disposal system.
Figure 6:
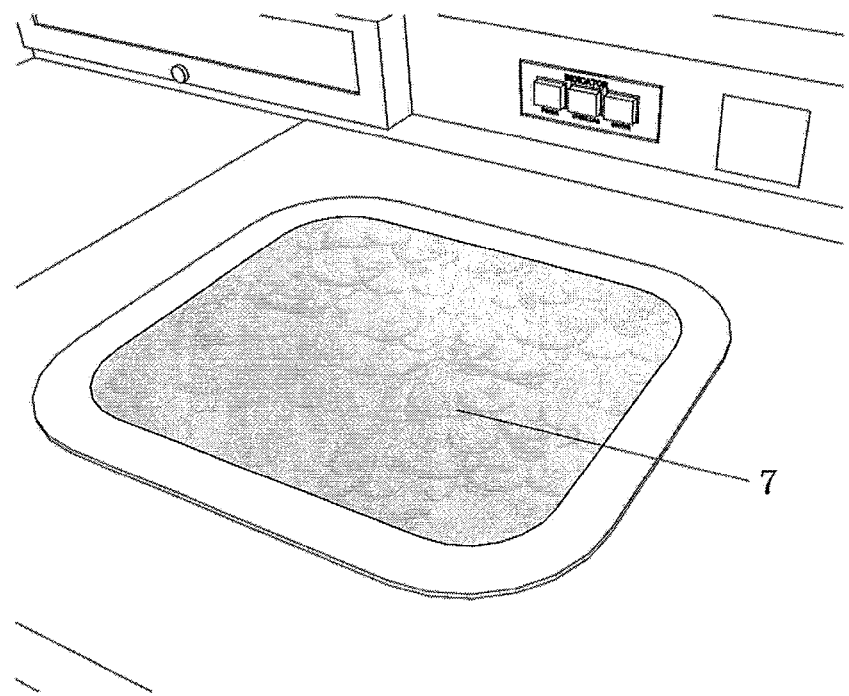
FIG. 6 is the schematic diagram of the cover in the kitchen waste disposal system (vapor can be attached to the cover to form water drops)
Figure 7:
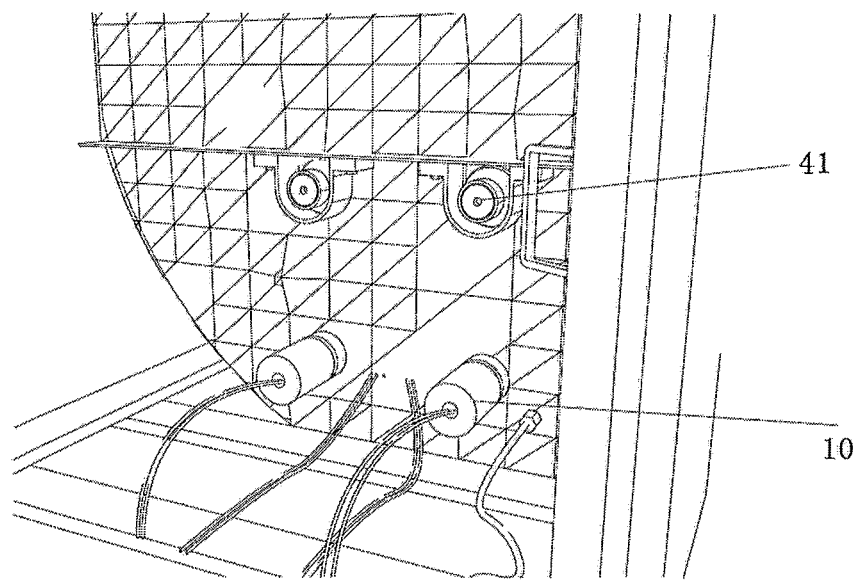
FIG. 7 is the schematic diagram of the double-shaft double-electric temperature control tube in the kitchen waste disposal system.
Figure 8:
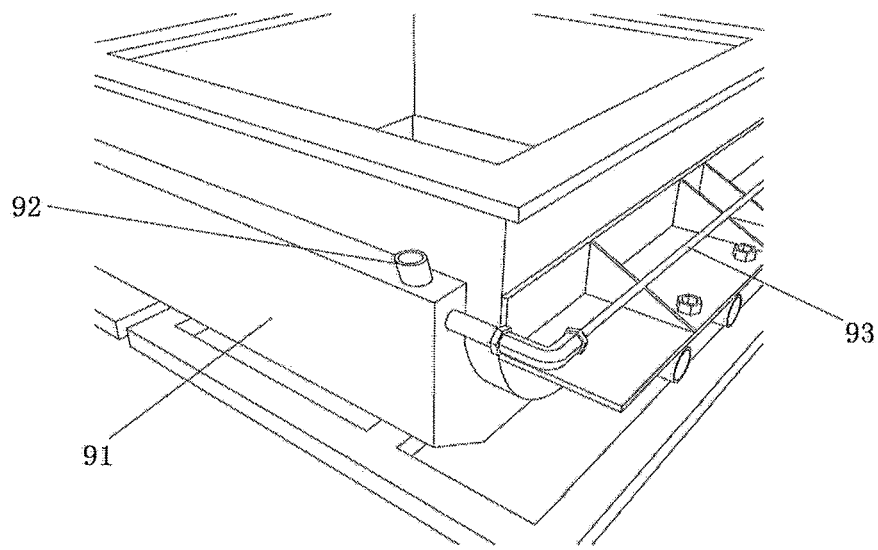
FIG. 8 is the schematic diagram of the sealed double-layer oil pressure temperature control device in the kitchen waste disposal system.
Figure 9:
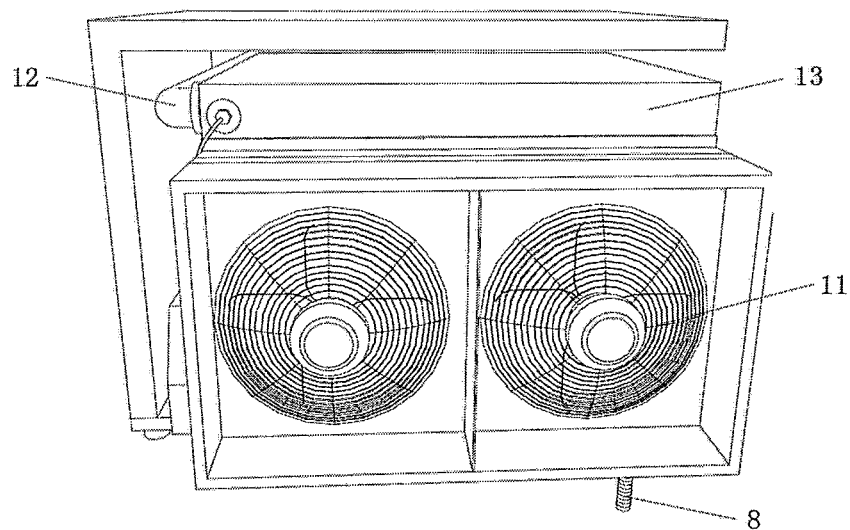
FIG. 9 is the schematic diagram of the double-fan air exhaust and deodorization device in the kitchen waste disposal system.

Paddle-type stirring mechanism:

The paddle-type stirring mechanism 6 comprises a paddle W-shaped treatment groove 61 which is positioned at the lower part of the mechanical gear grinding mechanism, and after gear grinding, food residue enters the W-shaped treatment groove. The W-shaped treatment groove is 100 cm in length, 60 cm in width and 50 cm in depth, and can accommodate 90 to 110 kg of food residue, the bottom of the treatment groove is W-shaped, the left and right side walls of the treatment groove are arc-shaped, and a ridged bulge 63 is formed in the middle of the treatment groove. Besides having the conventional functions of tumbling and rotating, the treatment groove can transfer the waste on the right side to the left side when discharging waste; and the middle bulge acts as a retaining ridge so as to propel prepared fertilizer towards the outlet. Two rotating shafts are mounted in the middle of the W-shaped treatment groove, each rotating shaft is connected with 5 T-shaped paddles 62, the T-shaped paddles are uniformly spaced, the stretching angles of the T-shaped paddles 62 are also spaced uniformly, and the angle and direction of each T-shaped paddle are designed to be matched with the position of the prepared fertilizer outlet 64. See FIG. 5.

Gear crushing converts all food residue into pasty organisms which are fed into the W-shaped treatment groove 61; the cross shafts in the treatment groove 61 are provided with T-shaped paddles 62 with different angles which can uniformly stir the pasty organisms fed into the treatment groove and enable the smooth generation of gas; and a humidity sensor and a temperature sensor are arranged at the top of the treatment groove 61, and the control system can effectively control the data changes of the humidity and temperature through signals transferred by the sensors, so that the food residue can be decomposed microbiologically while being metabolized into water, gas and biological heat energy.

Environmental Treatment Process:

1. Water evaporation: because of the temperature sensor arranged at the top of the W-shaped treatment groove 61, the control system can conduct constant temperature control of the temperature in the treatment groove 61, so that water in the kitchen waste entering the treatment groove can be turned into vapor. When arriving at the cover 7, the vapor becomes water drops which are converged to flush the inner wall of the quadrangled V-shaped feed inlet 1 and the food residue on the buckle gears 31 and 32 of the gear grinding mechanism, so that the effect of complete self-cleaning can be achieved. After being filtered, the water is discharged as clean water through the drainage conduit 8.

2. Circulated temperature baking: the W-shaped treatment groove 61 employs the sealed U-shaped groove 91 and the thermostatic tube to control the temperature of heavy oil, the sealed U-shaped groove 91 is provided with a heavy oil refueling port 92 and a heavy oil outlet 93, heat generated inside the treatment groove 61 can kill the majority of pathogenic microorganisms and parasites, and through the temperature control by the temperature control sensor 10, the temperature error ranges from minus 1° C. to plus 1° C.

3. Ventilating and deodorization: after converging on the cover 7 and flushing, vapor is absorbed into the air discharge duct 12 under the wind force of the double fan 11. The odor collection system 13 is connected with the air discharge duct 12 and can discharge high pressure plasma electromagnetic field to perform ionized charge deodorization on odor ions. Charged tiny ions (dust particles) are collected by absorption units and deodorized. Over 90% of harmful gas is exterminated. Clean air is discharged through the air discharge outlet and complies with the criteria for air discharge.

4. Granular fertilizer formation: after paddle-type stirring and 8 to 12 hours under the above-mentioned working environment, food residue can be converted into granular organic fertilizer which is automatically discharged to the fertilizer outlet 64. Fertilizer humidity ranges from 15% to 20%. The fertilizer is only stored in the aerophobic container for spontaneous secondary fermentation continuing 30 to 60 days until the humidity is reduced to around 10%. After being applied to soil, the fertilizer can coexist with beneficial microorganisms, thereby suppressing the activities of harmful bacteria, endowing soil with the ability to resist disease, and softening soil. The fertilizer has strong granules and serves as organic fertilizer with high nutritional value.

Figure 13:
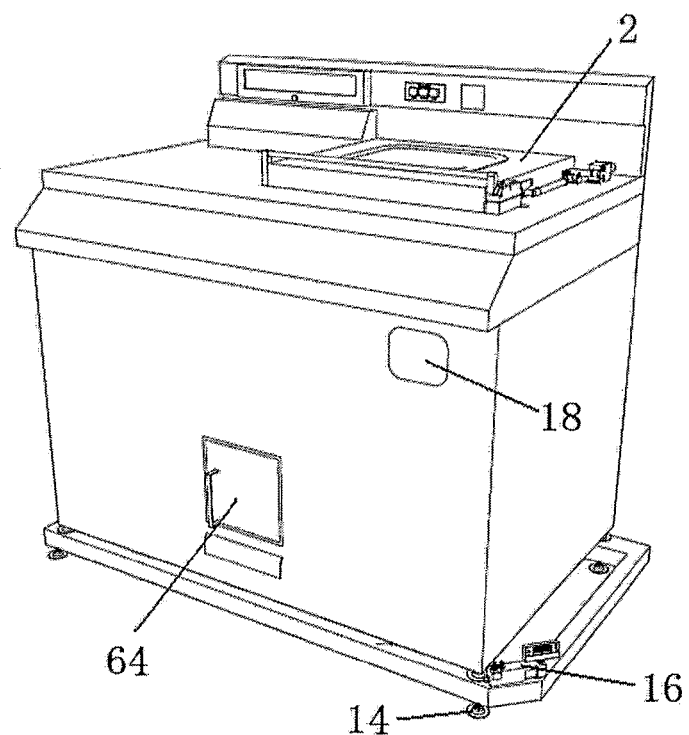
FIG. 13 is the schematic diagram of the appearance of the kitchen waste disposal system.
Figure 14:
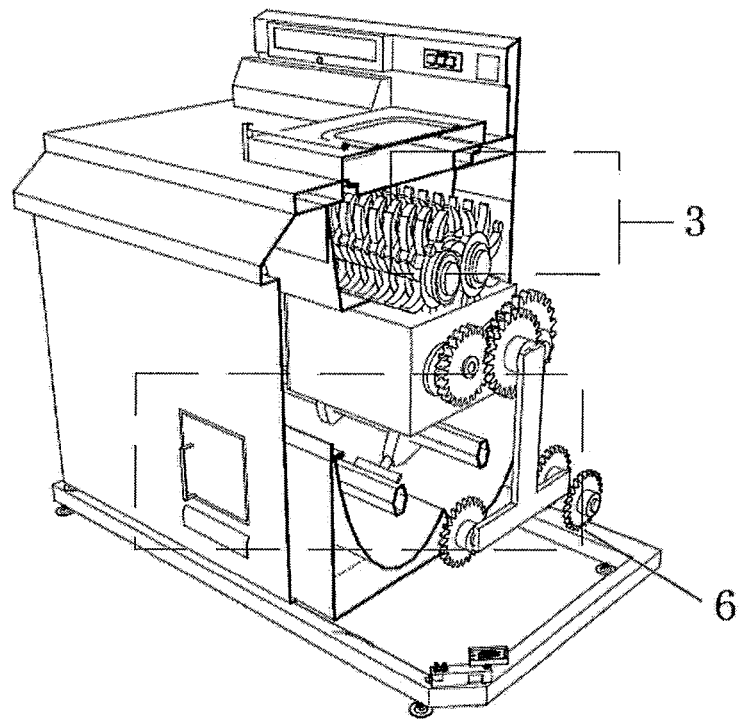
FIG. 14 is the schematic diagram of the interior structure of the kitchen waste disposal system.

The overall appearance of the disposal system is shown in FIG. 13, and the interior overall structure of the disposal system is shown in FIG. 14.

Ancillary facilities:

1. The four-corner balance electronic scale 16 is an electronic weight recorder mounted on the machine bottom socle 14, can record feed and discharge data, and is provided with an LED screen display 15.

2. The decomposable starch film paper bag 17 (as shown in FIG. 13) can be put into the feed port of the system after collecting food residue, and the starch film paper bag and the kitchen waste can be degraded altogether.

The above disclosed embodiment is only one of the specific embodiments of the invention. However, the invention is not confined to the embodiment, and any change conceivable by technicians in this field should fall into the scope in which the invention is protected.

The invention claimed is:

1. A kitchen waste disposal system comprising:
a residue feeding mechanism which receives kitchen waste and leads the kitchen waste into a mechanical gear grinding zone in the disposal system;
a mechanical gear grinding mechanism with a double-shaft bi-directional gear grinding component, wherein two gear shafts are arranged in parallel and rotate in opposite directions, each gear shaft is provided with first buckle gears and second buckle gears, and the first buckle gears and the second buckle gears are combined to crush the kitchen waste from the residue feeding mechanism; and
a stirring mechanism comprising a W-shaped treatment groove and a paddle component in the middle of the treatment groove, the kitchen waste is crushed into paste by the mechanical gear grinding mechanism, the pasty kitchen waste is stirred in the treatment groove and then treated with water evaporation, circulated temperature baking and ventilative deodorization to prepare granular organic fertilizer which is shoveled by the paddle component to the outlet.

2. The kitchen waste disposal system according to claim 1, wherein the residue feeding mechanism is provided with a quadrangled V-shaped feed inlet.

3. The kitchen waste disposal system according to claim 2, wherein the quadrangled V-shaped feed inlet is covered with a safety valve, a right-angle sensor is arranged at the rear part of the safety valve, and an adapter-type sensor is arranged at the front part of the safety valve.

4. The kitchen waste disposal system according to claim 1, wherein the mechanical gear grinding mechanism further comprises a fixed gear cleaning row, the gear shafts are moderately rotated backwards when the first buckle gears and the second buckle gears are prevented from being combined to crush the kitchen waste, and residue on buckle gear teeth is cleaned up through retaining gear teeth of the fixed gear cleaning row.

5. The kitchen waste disposal system according to claim 1, wherein the left side wall and the right side wall of the W-shaped treatment groove are arc-shaped, and a ridged bulge is arranged in the middle of the W-shaped treatment groove.

6. The kitchen waste disposal system according to claim 5, wherein the paddle component comprises two rotating shafts and T-shaped paddles respectively arranged on the two rotating shafts, the plurality of T-shaped paddles on each rotating shaft are spaced uniformly, and the stretching angle and direction of each T-shaped paddle are matched with the position of the outlet.

7. The kitchen waste disposal system according to claim 1, wherein a humidity sensor and a temperature sensor connected with a control system are arranged at the top of the W-shaped treatment groove, and pasty kitchen waste in the W-shaped treatment groove is degraded biologically while being metabolized into water, gas and biological heat energy in an environment with high temperature and high humidity.

8. The kitchen waste disposal system according to claim 7, wherein, on the cover of the W-shaped treatment groove, vapor is condensed into water to wash the inner wall of the residue feeding mechanism and the mechanical gear grinding mechanism.

9. The kitchen waste disposal system according to claim 1, wherein a sealed U-shaped groove and a thermostatic tube are combined to control the temperature of heavy oil so that the constant temperature environment in the W-shaped treatment groove can be controlled.

10. The kitchen waste disposal system according to claim 8, wherein the disposal system is further provided with a ventilative deodorization device which comprises a double fan, an odor collector and an air discharge duct, the vapor is blown into the air discharge duct through the double fan, and the odor collector is connected with the air discharge duct for ionized deodorization of odor ions.

11. The kitchen waste disposal system according to claim 1, wherein a four-corner balance electronic scale is arranged at base foot of the disposal system and is used for recording feed and discharge data.

12. The kitchen waste disposal system according to claim 1, wherein the disposal system further comprises a starch film paper bag for collecting kitchen waste.

* * * * *